(12) United States Patent
Chen et al.

(10) Patent No.: US 12,402,228 B2
(45) Date of Patent: Aug. 26, 2025

(54) AMBIENT LAMP APPARATUS AND LIGHTING-EFFECT LAYER COORDINATED PLAYBACK METHOD AND DEVICE, MEDIUM

(71) Applicant: Shenzhen Intellirocks Tech. Co., Ltd., Shenzhen (CN)

(72) Inventors: Qinbao Chen, Shenzhen (CN); Wenlong Wu, Shenzhen (CN)

(73) Assignee: Shenzhen Intellirocks Tech. Co., Ltd., Shenzhen (CN)

( * ) Notice: Subject to any disclaimer, the term of this patent is extended or adjusted under 35 U.S.C. 154(b) by 0 days.

(21) Appl. No.: 19/015,577

(22) Filed: Jan. 9, 2025

(65) Prior Publication Data

US 2025/0234441 A1    Jul. 17, 2025

(30) Foreign Application Priority Data

Jan. 11, 2024   (CN) .......................... 202410043378.3

(51) Int. Cl.
   *H05B 47/165*   (2020.01)
   *H05B 47/155*   (2020.01)

(52) U.S. Cl.
   CPC ......... *H05B 47/165* (2020.01); *H05B 47/155* (2020.01)

(58) Field of Classification Search
   CPC ............................ H05B 47/165; H05B 47/155
   See application file for complete search history.

(56) References Cited

U.S. PATENT DOCUMENTS

| 10,368,424 B2 * | 7/2019 | Engelen ................. H05B 45/20 |
| 2011/0294566 A1 * | 12/2011 | Cardno .................... G07F 17/32 |
| | | 463/25 |

FOREIGN PATENT DOCUMENTS

CN    116567892 A    8/2023

* cited by examiner

*Primary Examiner* — Daniel D Chang
(74) *Attorney, Agent, or Firm* — Wenye Tan

(57) ABSTRACT

The present disclosure relates to an ambient lamp apparatus, lighting-effect layer coordinated playback method and a non-volatile readable storage medium. The method comprises: obtaining multiple lighting-effect layers; according to the layer level of each first lighting-effect layer that belongs to the overlay type, setting the respective stacking relationship thereof, and merging the respective first lighting-effect layers into a base layer in an overall lighting-effect; according to the layer level of each second lighting-effect layer that belongs to the carousel type, and using each second lighting-effect layer as carousel layers with corresponding sequences in the overall lighting-effect, respectively; controlling an ambient lamp to play the base layer continuously as a background lighting-effect and play each carousel layer alternately as a foreground lighting-effect, and rendering the overall lighting-effect through the background lighting-effect and the foreground lighting-effect together.

8 Claims, 4 Drawing Sheets obtaining multiple lighting-effect layers, each of which is provided with a layer level and a layer type, wherein the layer type is set as one of an overlay type and a carousel type   S5100 setting a stacking relationship of the respective first lighting-effect layers according to the layer level of each first lighting-effect layer that belongs to the overlay type, and merging the respective first lighting-effect layers into a base layer in an overall lighting-effect   S5200 setting a sequential relationship of the respective second lighting-effect layers according to the layer level of each second lighting-effect layer that belongs to the carousel type, and using each second lighting-effect layer as carousel layers with corresponding sequences in the overall lighting-effect, respectively   S5300 controlling an ambient lamp to play the base layer continuously as a background lighting effect, playing each of the carousel layers alternately as a foreground lighting effect, and rendering the overall lighting effect through the background lighting effect and the foreground lighting effect together   S5400

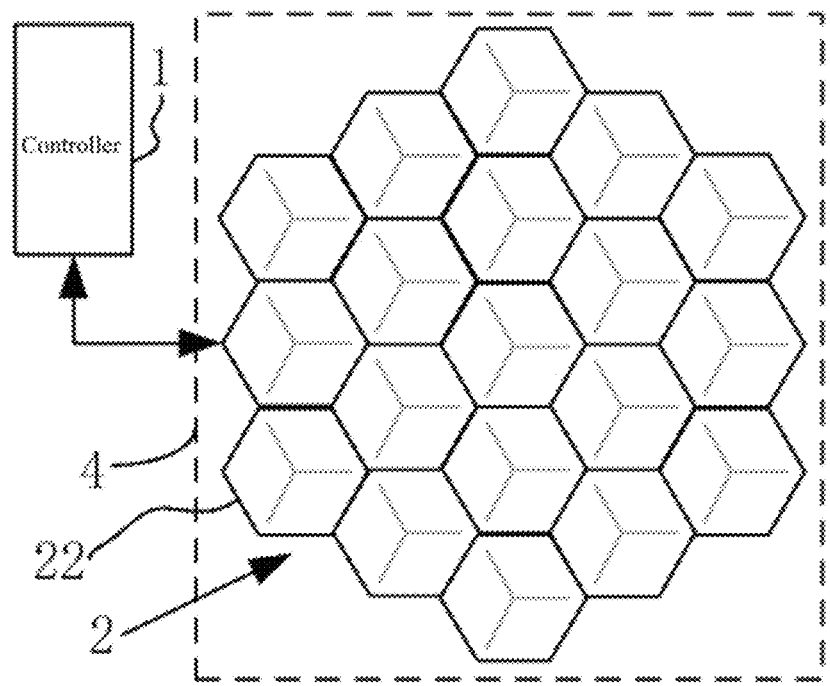

FIG. 3

| obtaining multiple lighting-effect layers, each of which is provided with a layer level and a layer type, wherein the layer type is set as one of an overlay type and a carousel type | S5100 |

| setting a stacking relationship of the respective first lighting-effect layers according to the layer level of each first lighting-effect layer that belongs to the overlay type, and merging the respective first lighting-effect layers into a base layer in an overall lighting-effect | S5200 |

| setting a sequential relationship of the respective second lighting-effect layers according to the layer level of each second lighting-effect layer that belongs to the carousel type, and using each second lighting-effect layer as carousel layers with corresponding sequences in the overall lighting-effect, respectively | S5300 |

| controlling an ambient lamp to play the base layer continuously as a background lighting effect, playing each of the carousel layers alternately as a foreground lighting effect, and rendering the overall lighting effect through the background lighting effect and the foreground lighting effect together | S5400 |

FIG. 4

AMBIENT LAMP APPARATUS AND LIGHTING-EFFECT LAYER COORDINATED PLAYBACK METHOD AND DEVICE, MEDIUM

CROSS-REFERENCES TO RELATED APPLICATIONS

This application claims priority to Chinese Patent Application No. CN202410043378.3, filed on Jan. 11, 2024, the content of which is hereby incorporated by reference in its entirety.

FIELD OF THE TECHNOLOGY

The present disclosure relates to the technical field of lighting technology and, specifically, to an ambient lamp apparatus, lighting-effect layer coordinated playback method and a non-volatile readable storage medium.

BACKGROUND OF THE DISCLOSURE

As one of smart lamps, an ambient lamp apparatus can serve to decorate indoor spaces and display information. With the improvement of people's economic level, the ambient lamp apparatus is becoming increasingly popular. One of the functions of the ambient lamp apparatus is to generate corresponding lighting-effect control data based on one or more given lighting-effect layers, and control an ambient lamp in the ambient lamp apparatus to play corresponding lighting-effects.

In the traditional technology, when playing lighting-effects based on multiple lighting-effect layers, to avoid confusion in business logic, the practice is either integrating multiple lighting-effect layers into a single lighting-effect layer for playback or playing multiple lighting-effect layers alternately. At the lighting-effect customization end, it is necessary to pay attention to balancing the relationship between multiple lighting-effect layers in the same lighting-effect application package, which brings significant inconvenience to users when customizing lighting-effects. Once the users fail to balance the relationship between various lighting-effect layers, the ambient lamp apparatus can also be led to errors in parsing the lighting-effect application package, which ends up with failure to correctly play the lighting-effects customized by the users. At the same time, for the users, balancing the relationship between multiple lighting layers when customizing the lighting-effects can also discourage them from customizing the lighting-effects and result in a poor user experience.

For the ambient lamp apparatus, if the ability to process the coordinated playback of multiple lighting-effect layers is absent from the business logic thereof, it will inevitably lead to poorer robustness of the ambient lamp apparatus, which directly affects the stability in using the ambient lamp apparatus and causes the users to question the quality of the ambient lamp apparatus.

In view of this, it is necessary to further improve the business logic of the ambient lamp apparatus in processing multiple lighting-effect layers, in order to achieve the functional upgrade of ambient lamp apparatus products.

SUMMARY

Embodiments of the present disclosure provides an ambient lamp apparatus, lighting-effect layer coordinated playback method, and a non-volatile readable storage medium as set forth in the appended set of claims.

According to one aspect of the present application, there is provided a lighting-effect layer coordinated playback method, comprising:

obtaining multiple lighting-effect layers, each of which is provided with a layer level and a layer type, wherein the layer type is set as one of an overlay type and a carousel type;

setting a stacking relationship of the respective first lighting-effect layers according to the layer level of each first lighting-effect layer that belongs to the overlay type, and merging the respective first lighting-effect layers into a base layer in an overall lighting-effect;

setting a sequential relationship of the respective second lighting-effect layers according to the layer level of each second lighting-effect layer that belongs to the carousel type, and using each second lighting-effect layer as carousel layers with corresponding sequences in the overall lighting-effect, respectively;

controlling an ambient lamp to play the base layer continuously as a background lighting-effect, playing each of the carousel layers alternately as a foreground lighting-effect, and rendering the overall lighting-effect through the background lighting-effect and the foreground lighting-effect together.

According to another aspect of the present application, there is provided an ambient lamp apparatus, comprising a central processing unit and a memory, wherein the central processing unit is used for calling and running a computer program that is stored in the memory to execute steps in the aforementioned lighting-effect layer coordinated playback method.

According to another aspect of the present application, there is provided a non-volatile readable storage medium, in which a computer program implemented according to the lighting-effect layer coordinated playback method is stored in form of computer-readable instructions, and executes steps included in the aforementioned lighting-effect layer coordinated playback method when called by a computer.

Other aspects of the present disclosure can be understood by those skilled in the art in light of the description, the claims, and the drawings of the present disclosure. The summary is not intended to limit the scope of any embodiment described.

BRIEF DESCRIPTION OF THE DRAWINGS

To describe the technical solutions of the embodiments of the present disclosure more clearly, the following briefly introduces the accompanying drawings used for describing the disclosed embodiments. Apparently, the accompanying drawings in the following description show merely some embodiments of the present disclosure, and a person of ordinary skill in the technology may derive other drawings from these accompanying drawings without creative efforts.

FIGS. 2 and 3 show structural forms of exemplary ambient lamp apparatuses in the present disclosure, wherein the ambient lamp in FIG. 2 is arranged in the form of a curtain lamp, and the ambient lamp in FIG. 3 is arranged in the form of a splicing lamp;

FIG. 4 is a flowchart diagram of a lighting-effect layer coordinated playback method in an embodiment of the present disclosure;

DETAILED DESCRIPTION

Figure 1:
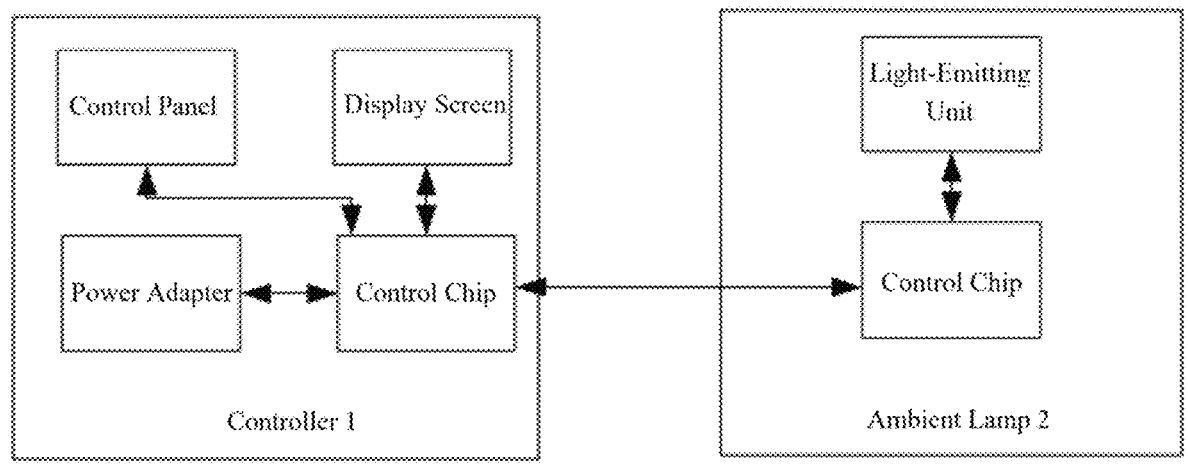
FIG. 1 is a principle diagram of the electrical structure of an ambient lamp apparatus in an embodiment of the present disclosure.

With reference to FIG. 1, as can be seen from the structure diagram of an ambient lamp apparatus provided in one embodiment of the present disclosure, the ambient lamp apparatus comprises a controller 1 and an ambient lamp 2. The ambient lamp 2 is electrically connected with the controller 1, in order to fall under control of a computer program that runs in the controller 1 and work together to achieve lighting-effect playback.

The controller 1 usually comprises a control chip, a communication component, and a bus connector. In some embodiments, the controller 1 can further be configured with a power adapter, a control panel, and a display screen among others according to needs.

The power adapter is mainly used for converting mains power into DC power, in order to supply power to the entire ambient lamp apparatus. The control chip can be implemented by using various types of embedded chips, such as Bluetooth SoC (System on Chip), WiFi SoC, MCU (Micro Controller Unit), and DSP (Digital Signal Processing). The control chip usually comprises a central processing unit and a memory, which are used for storing and executing program instructions to achieve corresponding functions, respectively. Various types of control chips as mentioned above can either have a built-in communication component, or be additionally configured with a communication component according to needs. The communication component can be used for communicating with an external apparatus, e.g., it can communicate with a terminal apparatus such as personal computers and various smartphones, so that after users issue various configuration instructions through their terminal apparatuses, the control chip of the controller 1 can receive the configuration instructions through the communication component and complete the basic configuration, so as to control the operation of the ambient lamp. In addition, through the communication component, the controller 1 can further obtain a lighting-effect application package that encapsulates multiple lighting-effect layers. The bus connector is mainly used for connecting the ambient lamp 2 in connection with a bus with a power source and providing lighting-effect playback instructions, and therefore providing pins that correspond to a power bus and a signal bus accordingly. As such, when the ambient lamp 2 needs to be connected with the controller 1, it can be connected with the bus connector through a corresponding connector of the ambient lamp. The control panel usually provides one or more buttons for implementing switch control of the controller 1, selecting various preset lighting-effect control manners, etc. The display screen can be used for displaying various types of control information, in order to cooperate with the buttons in the control panel and support the implementation of human-computer interaction functions. In some embodiments, the control panel and the display screen can be integrated into the same touch screen.

Figure 2:
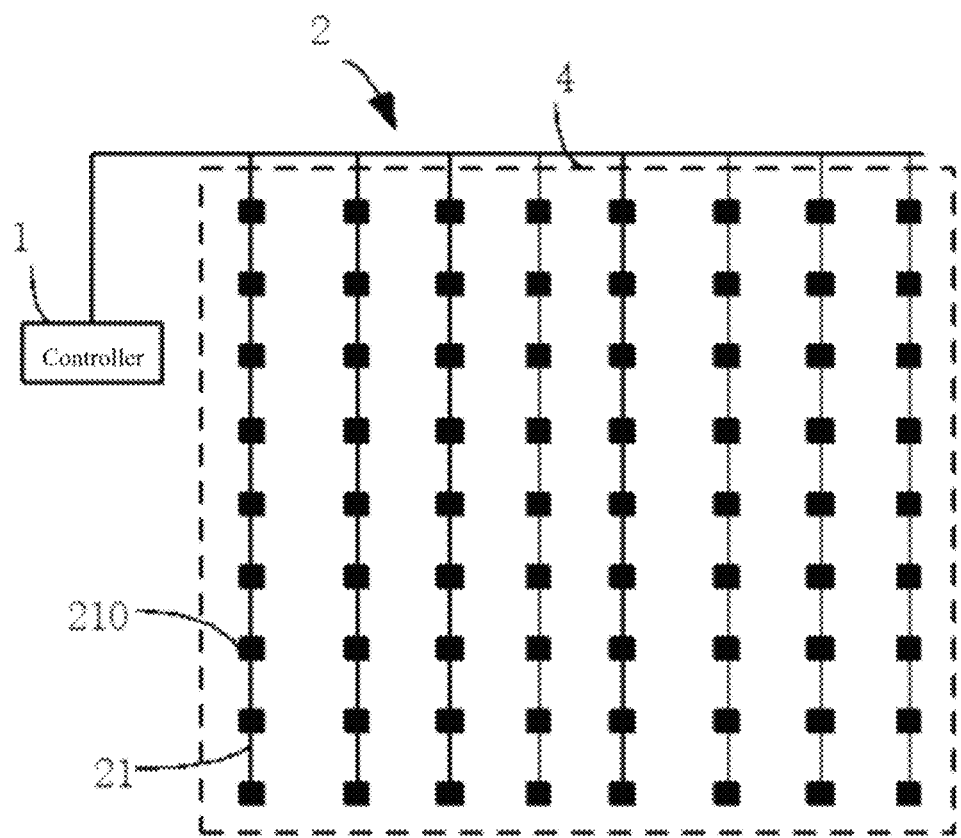

The specific form of the ambient lamp can be designed according to actual situations. For example, the ambient lamp in FIG. 2 is arranged in the form of a curtain lamp; the ambient lamp 2 comprises multiple light-emitting lamp belts 21 in connection with a bus; each light-emitting lamp belt 21 comprises multiple lamp beads 210 that are connected in series; each lamp bead 210 serves as a light-emitting unit; in general, the lamp beads 210 in each light-emitting lamp belt 21 are the same in number and arranged at equal intervals. When the ambient lamp 2 as the curtain lamp is put into use, each light-emitting lamp belt 21 thereof is usually unfolded according to the layout shown in FIG. 2, so that all the lamp beads in all the light-emitting lamp belts 21 are arranged in an array to form a lamp bead matrix structure. Since all the lamp beads can create a frame effect when emitting light in a coordinated manner, the surface where the entire lamp bead matrix structure is located forms a display frame 4. When the lighting-effect is played, a certain pattern effect can be formed within the range of the display frame 4.

Each light-emitting lamp belt 21 can be formed by connecting multiple light-emitting lamp beads 210 in series. Each light-emitting lamp bead 210 is one light-emitting unit. Each light-emitting lamp bead 210 in the same light-emitting lamp belt 21 transmits the operating current through the same set of cables in connection with the bus. In terms of the electrical connection relationship, each light-emitting lamp bead 210 in the same light-emitting lamp belt 21 can be connected in the manner of parallel connection. In one embodiment, each light-emitting lamp belt 21 in the same lamp bead matrix structure can be arranged at equal intervals in the direction of the bus, and the light-emitting lamp beads 210 of each light-emitting belt 21 are also arranged to correspond to each other in terms of number and position. In this way, the entire display frame 4 plays a role similar to a screen when the light-emitting effect thereof is viewed from a distance, and can form a pattern effect in the human eye vision.

Each light-emitting lamp bead 210 in each light-emitting lamp belt 21 of the ambient lamp 2 is also provided with a corresponding control chip. The control chip can be selected either according to the previous disclosure or from other more economical control chips. The main function thereof is to extract light-emitting color values that correspond to the lamp beads 210 from the lighting-effect playback instructions, and control light-emitting components in the light-emitting lamp beads 210 to emit light in corresponding colors. The light-emitting components can be LED lamps.

FIG. 3 further reveals another form of the ambient lamp in the ambient lamp apparatus in the present disclosure, which is a splicing lamp in essence. The ambient lamp 2 in the splicing lamp consists of one or more lamp modules 22. Inside the lamp module 22 of the splicing lamp, there are multiple light-emitting units (not shown) that are arranged at different positions of the lamp module in a standardized manner. Each light-emitting unit can also be provided with a corresponding light-emitting control chip for parsing corresponding control data to generate a corresponding light-emitting control signal. Through the light-emitting control signal, the light-emitting component in a corresponding light-emitting unit is controlled to emit light according to specific light-emitting color values. As a whole, the lamp module can also be provided with one independent control chip as a control unit to control the light emission of all the light-emitting units therein. The independent control unit can transmit corresponding time sequence control data to the control chip of each light-emitting unit to achieve the purpose of centralized control. Of course, the entire lamp module can also have individual control chips that directly control each light-emitting unit to achieve the purpose of playing corresponding lighting-effects. This can be a flexible design that mainly depends on the capabilities of the lamp module and the control chips used in the light-emitting units thereof, without affecting the manifestation of the creative spirit of the present disclosure. As can be learned from these principles, for one lamp module, it is feasible to not only control all the light-emitting units thereof to emit light at the same time, but apply the control granularity to each light-emitting unit. The finer the control granularity, the finer the generated lighting-effect.

Lamp modules 22 in different lamp module forms can be spliced with each other. For example, a quadrilateral lamp module adjoins any structural edge on the periphery of a hexagonal lamp module. It is not difficult to understand that, by matching lamp modules in different lamp module forms, more area array patterns can be constructed. When it is necessary to control each lamp module to play corresponding lighting-effects, by coordinating and controlling the light-emitting units of each lamp module to emit light, one display frame 4 can be presented to display the corresponding lighting-effects.

When the ambient lamp apparatus in the present disclosure is powered on, the control chip of the controller can call and execute a computer program from a memory. Through default initialization procedures of the computer program, the ambient lamp is powered on and initialized to complete the drive configuration of the ambient lamp and other hardware apparatuses.

In one embodiment, when the controller activates the ambient lamp, it can first send a self-test command to the ambient lamp, drive each lamp bead in each lamp belt or lamp module of the ambient lamp to return information on the position thereof in the lamp belt or lamp module. Each lamp bead is provided with a corresponding control chip for data communication with the control chip in the controller. Therefore, according to a serial communication protocol, the feature information of a lamp bead itself can be in tandem connection with the feature information of other lamp beads according to the sequence, so as to represent the position information of its own. The serial communication protocol executed between the controller and the lamp bead can be any one of IIC (Inter-Integrated Circuit), SPI (serial peripheral interface), and UART (Universal Asynchronous Receiver-Transmitter). After obtaining result data returned from self-test of each lamp bead through the bus, the controller parses the result data, and can determine the position of each lamp bead in the display frame 4 presented by the entire ambient lamp according to the sorting of the feature information of each lamp bead in the result data. As such, each lamp bead can be regarded as one light-emitting unit, which can be understood as a basic pixel. The position information of each lamp bead can be constructed as light source position distribution information. Subsequently, when constructing the lighting-effect control data, the controller can set a corresponding light-emitting color value for each basic pixel according to actual needs and based on the position information of each lamp bead, i.e., each light-emitting unit in the light source position distribution information.

In some embodiments, the controller 1 in the present disclosure can be implemented in an independent computer apparatus, as long as the computer apparatus is equipped with hardware corresponding to the controller 1, and implements the corresponding business logic of the controller 1 including the business logic executed by the method of the present disclosure as a computer program, which is installed and running in the computer apparatus. When the controller 1 is implemented in the computer apparatus, various resources inherent to the computer apparatus can be shared to save the overall cost of implementation. The computer apparatus referred to herein can be any terminal apparatus used by users, such as smartphones, personal computers, laptops, and tablet computers.

According to the product architecture and working principle of the above ambient lamp apparatus, the lighting-effect layer coordinated playback method in the present disclosure can be implemented as a computer program product, which is stored in a memory of a controller of an ambient lamp apparatus, and runs after a central processing unit calls it from the memory, so as to control an ambient lamp to play corresponding lighting-effects.

With reference to FIG. 4, in one embodiment, the lighting-effect layer coordinated playback method in the present disclosure, which is mainly implemented on a controller side of an ambient lamp apparatus and executed by a control chip of the controller, comprises:

Step S5100: obtaining multiple lighting-effect layers, each of which is provided with a layer level and a layer type, wherein the layer type is set as one of an overlay type and a carousel type;

The lighting-effect layer can be transmitted to the controller of the ambient lamp apparatus through an external apparatus such as a terminal apparatus, and it can also be called from its memory by the controller. A lighting-effect that needs to be played usually comprise multiple lighting-effect layers. Since the present disclosure can coordinate the playback of lighting-effect layers that belong to different layer types and different layer levels, various lighting-effect layers required for playing the overall lighting-effect in the present disclosure can come from either the same lighting-effect application package or different lighting-effect application packages. Each lighting-effect application package is independently customized, and the business logic corresponding to the lighting-effect motion procedures is generally a complete data body that creates a system of its own.

Each lighting-effect layer can be described through corresponding layer description data. The layer description data can describe both static lighting-effects, e.g., describing and displaying a five-pointed star, and dynamic lighting-effects, e.g., describing and displaying a moving five-pointed star. The data structure and encapsulation format among others of the layer description data can be set flexibly, as long as the lighting-effect customization end and the controller of the ambient lamp apparatus can correspondingly parse and apply.

Each lighting-effect layer will pre-set the corresponding layer type and layer level thereof, which are generally set by users during customization, or set by default by a system or program that provides customization services. Both the layer type and the layer level can be encapsulated together with the layer description data in the corresponding lighting-effect application package, as long as the mapping relationship between these data and the lighting-effect layer is established.

The layer type is used for indicating whether a corresponding lighting-effect layer belongs to the overlay type or the carousel type. In general, the layer type can only be set as one of the overlay type and the carousel type. Wherein, the overlay type means that the lighting-effect layer is suitable for merging with other lighting-effect layers into a single lighting-effect layer, while the carousel type means that a corresponding lighting-effect layer is a carousel layer that corresponds to one link, i.e., one sequence, of the overall lighting-effect.

The layer level is used for indicating the level of a corresponding lighting-effect layer. Unlike the traditional implementation manners, in the present disclosure, the layer level can play different command roles according to the layer type of the lighting-effect layer corresponding thereto. Wherein, when the layer type of a lighting-effect layer is the overlay type, the layer level of the lighting-effect layer is used for indicating the stacking relationship when the lighting-effect layer is merged with lighting-effect layers of the same type. Specifically, if the layer level of a current lighting-effect layer is the same as that of another lighting-effect layer, the two can be understood as being in a mixed relationship, and lighting parameters of light-emitting units that overlap with each other can be calculated and determined by mixing them; if the layer level of the current lighting-effect layer is different from that of another lighting-effect layer, they are in an overlay relationship, and a lighting-effect layer with a lower layer level will be overlaid with another lighting-effect layer with a higher layer level at overlapping light-emitting units. As can be seen, for a lighting-effect layer that belongs to the overlay type, the layer level of the lighting-effect layer can play a role of a command indicative of a merging relationship. When the layer type of a lighting-effect layer is the carousel type, the layer level of the lighting-effect layer is different from the former, and plays a role of indicating the sequential relationship in the carousel course. For example, a lighting-effect layer with a higher layer level has a higher sequence in the carousel procedures than another lighting-effect layer with a lower layer level. As such, for a lighting-effect layer that belong to the carousel type, the ordinal position thereof in the carousel course is specified through the layer level that it carries. By using layer levels to associate different types of lighting-effect layers, users can easily adjust the playback relationship between each lighting-effect layer and other lighting-effect layers when customizing lighting-effects. The data corresponding to the adjusted playback relationship are ultimately reflected in two fields: layer level and layer type. The underlying data structure remains unchanged. The efficiency advantages exist in various links such as representation, storage, transmission, and application of data of lighting-effect layers.

After obtaining multiple lighting-effect layers, the controller can distinguish them based on the layer type of each lighting-effect layer. For example, two layer queues can be constructed, which include an overlay layer queue and a carousel layer queue. Then, each lighting-effect layer that belongs to the overlay type can be added as each first lighting-effect layer to the overlay layer queue, while each lighting-effect layer that belongs to the carousel type can be added as each second lighting-effect layer to the carousel layer queue.

Step S5200: setting a stacking relationship of the respective first lighting-effect layers according to the layer level of each first lighting-effect layer that belongs to the overlay type, and merging the respective first lighting-effect layers into a base layer in an overall lighting-effect;

For each first lighting-effect layer that belongs to the overlay type, each first lighting-effect layer can be configured according to the overlay layer queue. Specifically, sorting processing can be performed according to the layer level of each first lighting-effect layer. For example, each first lighting-effect layer in the overlay layer queue can be sorted according to the layer level of each first lighting-effect layer, so that each first lighting-effect layer is sorted in ascending or descending sequence according to the layer level. In one embodiment, when there are multiple first lighting-effect layers with the same layer level, these first lighting-effect layers can be randomly arranged adjacent to each other. As such, each first lighting-effect layer in the entire overlay layer queue are arranged in an orderly manner. By sorting each first lighting-effect layer in the overlay layer queue, the ordinal position of each first lighting-effect layer is actually set, and the stacking relationship between these first lighting-effect layers is also set accordingly.

Therefore, based on the completion of sorting the overlay layer queue, each first lighting-effect layer therein can be dequeued one by one from the front or rear of the overlay layer queue. For the first one dequeued from the first lighting-effect layers, it can be used as a motherboard to continue to obtain the next first lighting-effect layer from the overlay layer queue, and then identify the level relationship between the layer levels of the two first lighting-effect layers that have already been dequeued. If the two have different layer levels, it indicates that the stacking relationship therebetween is an overlay relationship. Then, in the two first lighting-effect layers, one with a lower layer level is overlaid with the other with a higher layer level, so that they are mutually mapped between description data that correspond to the same light-emitting unit. Wherein, the description data with the lower layer level will be deleted, and only the description data with the higher layer level will be retained. If two have the same layer level, it indicates that the stacking relationship therebetween is a mixed relationship. Then, the two first lighting-effect layers are mutually mapped to description data that correspond to the same light-emitting unit for mixing. The specific mixing manner can be calculating the mean value of the description data corresponding to the two, e.g., calculating the mean value of the color values in the description data of the two, so as to achieve the mixing of the two and obtain the mixed description data. As can be seen, users can define the merging relationship between different lighting-effect layers by customizing the similarities and differences in the layer level of each lighting-effect layer that belongs to the overlay type, indicate the synthesis between two lighting-effect layers according to the mixed relationship or the overlay relationship, and obtain the synthesized base layer. By analogy, other first lighting-effect layers can continue to be dequeued from the overlay layer queue. Then, according to the same principle of merging two first lighting-effect layers, the first lighting-effect layer that is newly dequeued can continue to be merged with the base layer that is obtained by previously merging, so as to update the base layer. Finally, the complete base layer is obtained after dequeuing and merging all the first lighting-effect layers in the entire overlay layer queue.

The base layer in the present disclosure plays a role of defining the background lighting-effect in the overall lighting-effect played in the ambient lamp, and can be stored in a cache area for updating and calling. For the same reason, if a pre-set base layer has been already stored in the cache area, such as an initialized base layer, the base layer that has already existed in the cache area can be overlaid with a base layer obtained by merging according to the overlay layer queue, so as to achieve the update of the base layer.

Step S5300: setting a sequential relationship of the respective second lighting-effect layers according to the layer level of each second lighting-effect layer that belongs to the carousel type, and using each second lighting-effect layer as carousel layers with corresponding sequences in the overall lighting-effect, respectively;

For each second lighting-effect layer that belongs to the carousel type, each second lighting-effect layer can be configured based on the carousel layer queue. Specifically, sorting processing can be performed according to the layer level of each second lighting-effect layer. For example, each second lighting-effect layer in the carousel layer queue can be sorted according to the layer level of each second lighting-effect layer, so that each second lighting-effect layer is sorted in ascending or descending sequence according to the layer level. In one embodiment, when there are multiple second lighting-effect layers with the same layer level, these second lighting-effect layers can be randomly arranged adjacent to each other. As such, all the second lighting-effect layers in the entire carousel layer queue are arranged in an orderly manner. By sorting each second lighting-effect layer in the carousel layer queue, the ordinal position of each second lighting-effect layer is actually set, and it is just the ordinal position that can be used to indicate the corresponding sequence of the carousel layer when it is played in the overall lighting-effect.

Therefore, when each second lighting-effect layer needs to be played, each second lighting-effect layer can be controlled to be dequeued from the carousel layer queue in an orderly manner, and lighting-effects can be played according to each second lighting-effect layer.

Step S5400: controlling an ambient lamp to play the base layer continuously as a background lighting-effect, playing each of the carousel layers alternately as a foreground lighting-effect, and rendering the overall lighting-effect through the background lighting-effect and the foreground lighting-effect together.

Upon the completion of the standardized organization of multiple lighting-effect layers, the ambient lamp can be controlled to play the overall lighting-effect according to each lighting-effect layer. Specifically, the playback of the background lighting-effect and the foreground lighting-effect in the overall lighting-effect can be processed concurrently.

When playing the background lighting-effect, the underlying data used by the background lighting-effect are layer description data of the base layer. Based on the layer description data, corresponding lighting-effect control data can be generated and transmitted to each light-emitting unit of the ambient lamp. Each light-emitting unit controls light-emitting components thereof to emit corresponding light according to the control data corresponding thereto in the lighting-effect control data, thereby presenting the corresponding background lighting-effect in the entire ambient lamp. As each lighting-effect layer can be a dynamic lighting-effect, the lighting-effect control data of the base layer can also control the ambient lamp to present a dynamic background lighting-effect accordingly, which specifically depends on the description situation of the layer description data of each first lighting-effect layer.

When playing the foreground lighting-effect, the foreground lighting-effect is presented by playing multiple carousel layers sequentially. Therefore, regarding each carousel layer, it is necessary to call layer description data corresponding thereto, generate corresponding lighting-effect control data based on the layer description data, and transmit the lighting-effect control data to each light-emitting unit of the ambient lamp. Each light-emitting unit controls light-emitting components thereof to emit corresponding light according to the control data corresponding thereto in the lighting-effect control data. By playing each carousel layer sequentially in the same way as herein, a corresponding foreground lighting-effect is presented in the entire ambient lamp.

It is not difficult to understand that the background lighting-effect serves as a foil in the overall lighting-effect, and the foreground lighting-effect formed by playing each carousel layer sequentially is more prominent and more eye-catching against the background lighting-effect. As such, the overall lighting-effect is presented in the display frame of the ambient lamp. For example, the background lighting-effect can present the effect of a meteor shower in the night sky, while the foreground lighting-effect can present the effect of a truck passing by through one carousel layer, and then present the effect of a stationary tree through another carousel layer. As can be seen from this example, the present disclosure implements the function of coordinating the playback of multiple lighting-effect layers through standardized business logic, so that an overall lighting-effect, which is more complex and more vivid, can be achieved in the ambient lamp.

As can be seen from the above embodiments, the present disclosure has multiple advantages, which include, but are not limited to, the following aspects:

first of all, each of the multiple lighting-effect layers in the present disclosure will be labeled with the layer level thereof and the layer type thereof; classification processing will be carried out according to different situations of the layer type as they belong to the overlay type or the carousel type; for first lighting-effect layers that belong to the overlay type, according to the sequential relationship presented by their respective layer levels, all the first lighting-effect layers will be effectively merged into a base layer for playing the background lighting-effect in the overall lighting-effect; for second lighting-effect layers that belong to the carousel type, according to the sequential relationship presented by their respective layer levels, each second lighting-effect layer serves as each carousel layer that sequentially corresponds to the foreground lighting-effect in the overall lighting-effect; by means of both the classification processing of the two kinds of lighting-effect layers that originally belong to different playback types and the differentiated use of the original layer levels of the lighting-effect layer in different playback types, the roles of multiple lighting-effect layers in the overall lighting-effect are standardized, which enables the ambient lamp apparatus to process multiple lighting-effect layers in an orderly manner; this not only enhances the compatibility and robustness of the ambient lamp apparatus, but also reduces the complexity of customizing lighting-effects for users and comprehensively improves the user experience.

secondly, the present disclosure uses lighting-effect layers that belong to the overlay type to construct a base layer, standardizes the base layer as a background lighting-effect in the overall lighting-effect presented by an ambient lamp, uses lighting-effect layers that belong to the carousel type as carousel layers, and plays each carousel layer alternately to present a foreground lighting-effect in the overall lighting-effect; this can enrich the forms of lighting-effects, so that the lighting-effect content presented by multiple carousel layers can be highlighted by the same lighting-effect background; further, users can define more complex overall lighting-effect content, which makes the overall lighting-effect more vivid, and can further enhance the atmospheric immersion;

in addition, the present disclosure further expands the functions of the ambient lamp apparatus, thereby achieving the iterative upgrade of the ambient lamp apparatus; the improvement of the comprehensive performance of ambient lamp apparatus products can facilitate the promotion and popularization of the ambient lamp apparatus, and provide relatively high economic benefits.

Figure 5:
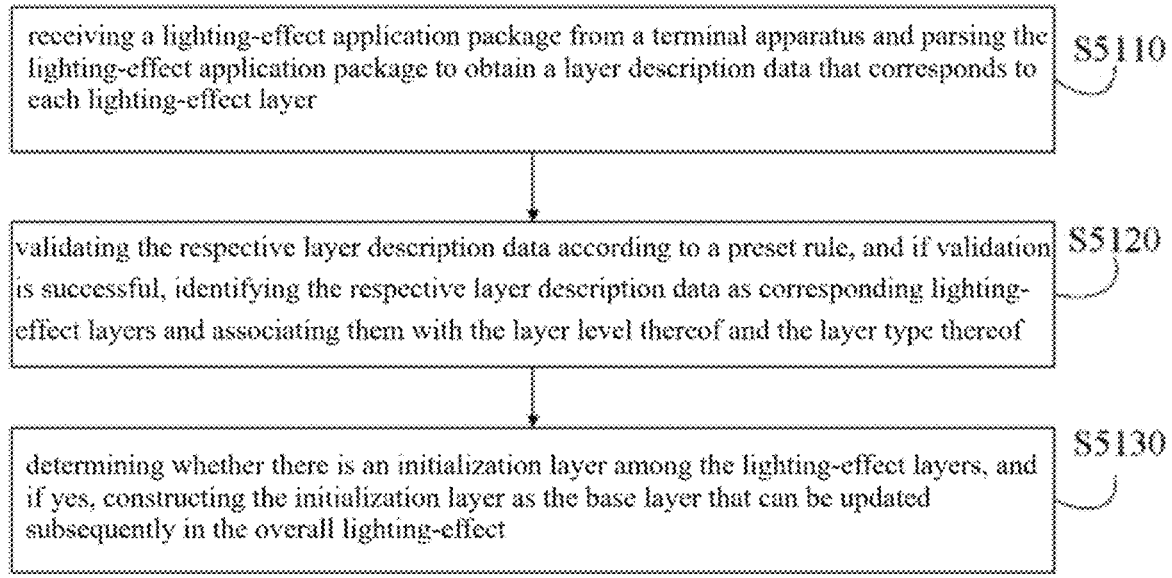
FIG. 5 is a flowchart diagram of obtaining a lighting-effect application package in an embodiment of the present disclosure.

On the basis of any embodiment of the method in the present disclosure, with reference to FIG. 5, said obtaining multiple lighting-effect layers comprises:

Step S5110: receiving a lighting-effect application package from a terminal apparatus and parsing the lighting-effect application package to obtain a layer description data that corresponds to each lighting-effect layer;

A user can customize a lighting-effect application package in a terminal apparatus, which provides corresponding computer programs for the user to edit lighting-effects. In the editing course, the user defines multiple lighting-effect layers, specifies the layer level and layer type of each lighting-effect layer, and then submits them for application. In response to events submitted by the user, the terminal apparatus generates a layer description data that corresponds to each lighting-effect layer according to various data edited and generated by the user, and associates the layer level and type of each lighting-effect layer. According to preset formats, the layer description data of each lighting-effect layer as well as the layer level and layer type thereof are constructed into a lighting-effect application package, and the lighting-effect application package is transmitted to the controller of the ambient lamp apparatus. After receiving the lighting-effect application package, the controller parses the lighting-effect application package to obtain the layer description data of each lighting-effect layer, as well as the corresponding layer level and layer type. Of course, the layer level and layer type of the same lighting-effect layer can also be encapsulated together with the layer description data of the lighting-effect layer into the same data structure.

Step S5120: validating the respective layer description data according to a preset rule, and if validation is successful, identifying the respective layer description data as corresponding lighting-effect layers and associating them with the layer level thereof and the layer type thereof;

One or more preset rules can be pre-stored in the controller and used for validating all the layer description data. For example, the preset rules can be arranged to validate whether the lamp type described by the layer description data matches the lamp type of the current ambient lamp apparatus. When the validation fails, the processing of the lighting-effect application package will be terminated, and alarm information will be output. When the validation is passed, all the layer description data in the lighting-effect application package can be extracted for subsequent processing, and it is ensured that the corresponding relationship between the lighting-effect layer, the corresponding layer description data thereof, the layer level thereof, and the layer type thereof is established for calling.

Step S5130: determining whether there is an initialization layer among the lighting-effect layers, and if yes, constructing the initialization layer as the base layer that can be updated subsequently in the overall lighting-effect.

Considering the need to provide a base layer that corresponds to the background lighting-effect, an initialization layer can be provided in the lighting-effect application package. The controller identifies each lighting-effect layer that is parsed from the lighting-effect application package, and determines whether an initialization layer is present therein through the specific identity that corresponds to the layer description data of each lighting-effect layer. When there is no initialization layer, no processing is performed. When there is an initialization layer, the initialization layer, as a base layer that can be updated later, can be directly stored in the cache area as mentioned above. In one embodiment, if the controller constructs a new base layer according to the lighting-effect layer that belongs to the overlay type, the new base layer takes the place of the base layer in the cache area, thereby realizing update and replacement.

As can be learned from the above embodiments, in the present disclosure, the lighting-effect application package customized by the user is received from the terminal device, and after parsing and validating the lighting-effect application package, each lighting-effect layer is determined to ensure that the ambient lamp apparatus can effectively play the legally defined lighting-effects. In addition, the initialization layer therein serves as a base layer, and plays a role of a backup for the background lighting-effect in the overall lighting-effect to be presented. When the controller cannot smoothly synthesize the base layer that corresponds to the background lighting-effect, or when the user does not customize the lighting-effect layer that belongs to the overlay type to define the base layer that corresponds to the background lighting-effect, an effective background lighting-effect is still provided for the overall lighting-effect, which ensures that the overall lighting-effect presented by the ambient lamp offers a stronger spatial three-dimensional feel and has a better immersive effect.

On the basis of any embodiment of the method in the present disclosure, steps after obtaining multiple lighting-effect layers comprise:

Step S5101: determining whether there are first lighting-effect layers that belong to the overlay type among the multiple lighting-effect layers, and if not, generating the base layer according to preset rules or retrieving a pre-stored base layer from a storage apparatus.

In this embodiment, the initialization layer may not be provided in the lighting-effect application package, i.e., the base layer is not defined. After extracting each lighting-effect layer from the lighting-effect application package, post-detection can also be performed to determine whether there is a first lighting-effect layer that belongs to the overlay type in these lighting-effect layers. If yes, it indicates that the base layer constructed on the basis of the first lighting-effect layer will be obtained subsequently, which can ensure that there is a background lighting-effect in the overall lighting-effect; thus, there is no need for additional processing. If there is no first lighting-effect layer, one base layer can be provided for the overall lighting-effect to display the background lighting-effect.

In an alternative embodiment, the base layer can be generated according to preset rules. For example, the base layer can be defined as a layer description data that corresponds to a completely black background or a completely white background. In another alternative embodiment, one or more layer description data suitable for presenting the background lighting-effect can be pre-stored in the controller, and called herein, directly and randomly.

For the same reason, the base layer determined in this embodiment can be stored in the cache area for calling. Of course, it can also be updated and replaced.

The above embodiments are suitable for circumstances where the base layer corresponding to the background lighting-effect cannot be provided on the basis of the lighting-effect application package. Multiple lighting-effect layers in the lighting-effect application package are subjected to posterior recognition. In the case where the base layer cannot be provided, a base layer is provided separately to further ensure that the overall lighting-effect can smoothly display the background lighting-effect.

On the basis of any embodiment of the method of the present disclosure, said setting a stacking relationship of the respective first lighting-effect layers according to the layer level of each first lighting-effect layer that belongs to the overlay type and merging the respective first lighting-effect layers into a base layer in the overall lighting-effect comprises:

Step S5210: sorting each first lighting-effect layer that belongs to the overlay type among the multiple lighting-effect layers in ascending order of the layer level thereof to obtain a layer list;

In this embodiment, a two-dimensional relational data table can be used to standardize the stacking relationship between the first lighting-effect layers that belong to the overlay type in multiple lighting-effect layers. To this end, each first lighting-effect layer that belongs to the overlay type in multiple lighting-effect layers is stored in a layer list. Then, the layer list is sorted. For example, each first lighting-effect layer is sorted in ascending sequence according to the layer level of each first lighting-effect layer, so as to form a sorted layer list.

Step S5220: mixing multiple first lighting-effect layers with the same layer level in the layer list to obtain a single first lighting-effect layer, and overlaying first lighting-effect layers that are sorted earlier with first lighting-effect layers that are sorted later to generate the latest base layer.

When a base layer needs to be constructed, multiple first lighting-effect layers that belong to the same layer level in the layer list are directly subjected to corresponding mixed processing according to the mixed relationship disclosed in the previous text; the layer description data of overlapping areas between the multiple first lighting-effect layers are mixed to obtain the same layer description data; thus, the merged first lighting-effect layer is obtained. It is not difficult to understand that if there are multiple first lighting-effect layers in each layer level of two different layer levels, then a single first lighting-effect layer is obtained after merging multiple first lighting-effect layers that correspond to each layer level. The layer level of the first lighting-effect layer obtained by merging is also the original layer level before merging. In the exemplary operation of mixed processing, the layer description data of two overlapping areas can be mixed by calculating the mean value.

After merging, all the first lighting-effect layers in the layer list have been sorted in sequence, and there are not multiple first lighting-effect layers with the same layer level any more. On this basis, according to the overlay relationship as revealed above, the first lighting-effect layer with a lower layer level can be sequentially overlaid with the first lighting-effect layer with a higher layer level in the layer list, so that the layer description data of overlapping areas only retain the layer description data that correspond to the first lighting-effect layer with a higher layer level. According to this operation, each first lighting-effect layer in the layer list is stacked layer by layer in the pattern effect, as the lower layer is overlaid with the higher layer. Finally, a base layer is obtained. For the same reason, the base layer can be replaced and updated in the storage area as revealed above for calling.

In the above embodiments, a layer list in the form of two-dimensional relational data is used as a data medium to process each first lighting-effect data by first mixing and then stacking, and the operation on the layer list is not limited by the first-in-first-out mechanism of the queue, which facilitates batch processing and can improve the processing efficiency. Therefore, when there are a relatively large number of lighting-effect layers, the advantage in the higher efficiency can be reflected.

On the basis of any embodiment of the method in the present disclosure, said controlling an ambient lamp to play the base layer continuously as a background lighting-effect and play each of the carousel layers alternately as a foreground lighting-effect comprises:

Step S5450: sending a first lighting-effect control data that corresponds to the base layer to the ambient lamp, and playing a corresponding background lighting-effect via the ambient lamp;

When the background lighting-effect needs to be displayed in the ambient lamp, the base layer can be called from the cache area, and the corresponding lighting-effect control data, i.e., the first lighting-effect control data, can be generated according to the layer description data of the base layer. Since the base layer in the cache can be replaced and updated, calling the base layer from the cache area as specified can ensure that the background lighting-effect can be constructed with the latest base layer as set.

The first lighting-effect control data are the lighting-effect control data corresponding to each playback frame that is determined according to the layer description data. The lighting-effect control data corresponding to each playback frame include the control data corresponding to the light emitted by each light-emitting unit in the ambient lamp. Corresponding lighting-effect control data can be sent to the ambient lamp for each playback frame. After receiving the lighting-effect control data corresponding to each playback frame, each light-emitting unit of the ambient lamp extracts the control data corresponding thereto and controls the light-emitting components of its own to emit corresponding light. The control data generally have specified color values to make the corresponding light-emitting components emit the corresponding color light. For each playback frame, multiple light-emitting units in the ambient lamp collaborate to emit light, which can present a picture. By sequentially playing multiple playback frames, the lighting-effect motion procedures described by the layer description data can be displayed, so as to play the background lighting-effect in the ambient lamp, for setting off the foreground lighting-effect.

Step S5460: sending a second lighting-effect control data that corresponds to each carousel layer to the ambient lamp sequentially according to a carousel sequence, and playing the foreground lighting-effect via the ambient lamp with the corresponding sequence;

In this step, as a step that can be executed concurrently with Step S5450, each second lighting-effect layer, i.e., each carousel layer, in the mixed layer queue can be called and played, in order to present the foreground lighting-effect against the background lighting-effect in the ambient lamp.

Since the sequence of each second lighting-effect layer has already been arranged in the mixed layer queue, as long as the first-in-first-out mechanism of the queue is followed, each second lighting-effect layer can be dequeued from either end of the mixed layer queue and played as a carousel layer.

When a carousel layer is played, for the same reason, generated to correspond to the layer description data of the carousel layer, the lighting-effect control data, i.e., the second lighting-effect control data, are sent to the ambient lamp. The light-emitting units of the ambient lamp emit the corresponding color light according to the control data that correspond thereto in the second lighting-effect control data.

For the same reason, the second lighting-effect control data are the lighting-effect control data corresponding to each playback frame that is determined according to the layer description data of the current carousel layer. The lighting-effect control data corresponding to each playback frame include the control data corresponding to the light emitted by each light-emitting unit in the ambient lamp. The corresponding lighting-effect control data can be sent to the ambient lamp for each playback frame. After receiving the lighting-effect control data corresponding to each playback frame, each light-emitting unit of the ambient lamp extracts the control data corresponding thereto and controls the light-emitting components of its own to emit corresponding light. The control data generally have specified color values to make the corresponding light-emitting components emit the corresponding color light. For each playback frame, multiple light-emitting units in the ambient lamp collaborate to emit light, which can present a picture. By sequentially playing multiple playback frames, the lighting-effect motion procedures described by the layer description data can be displayed, so as to play the foreground lighting-effect that corresponds to the current carousel layer in the ambient lamp.

Step S5470: iterating the previous step when the carousel sequence ends, and continuing the carousel of the foreground lighting-effect.

When one iterates to dequeue each carousel layer and finishes dequeuing the last carousel layer in Step S5460, the overall lighting-effect displayed in the ambient lamp completes one iteration. To keep the ambient lamp working continuously, at this moment, one can skip to Step S5460 and continue to iterate a carousel of each second lighting-effect layer, so as to realize the loop playback of the foreground lighting-effect. Of course, the playback of the background lighting-effect also continues to be kept.

In some embodiments, in the course of continuing to iterate the playback of the foreground lighting-effect according to this step, the second lighting-effect control data generated in the first iteration can be reused to avoid repetitive calculation and reduce the computing resource overhead of the ambient lamp apparatus.

As can be learned from the above embodiments, when the ambient lamp is controlled to display the overall lighting-effect, the display of the background lighting-effect and the foreground lighting-effect can be controlled concurrently. Wherein, the background lighting-effect is continuously controlled to be played by using the first lighting-effect control data that correspond to the base layer, while the foreground lighting-effect is controlled to be played in a carousel manner by using the second lighting-effect control data that correspond to each carousel layer. In this way, the effect is achieved, i.e., alternately playing the foreground lighting-effect on the basis of the same background lighting-effect. Since the lighting-effect that corresponds to each carousel layer may also be a dynamic lighting-effect, the overall lighting-effect displayed in the ambient lamp is more vivid, more fictile, and easier to produce the immersive effect.

On the basis of any embodiment of the method in the present disclosure, steps before sending a first lighting-effect control data that corresponds to the base layer to the ambient lamp comprise:

Step S5410: in accordance with the layer description data of the base layer, determining a sub-frame description data of each playback frame that corresponds to lighting-effect motion procedure described thereby;

To provide the ambient lamp with the first lighting-effect control data that correspond to the background lighting-effect, the layer description data of the base layer can be called for basic processing. Specifically, according to the lighting-effect motion procedures described by the layer description data, the layer description data can be processed by framing. For example, the layer description data of the base layer describe the completion of the translation operation of one pattern within 1 second; based on this, the specific playback frame number of the lighting-effect motion procedures can be determined according to the frame rate preset for the ambient lamp; then, the sub-frame description data that corresponds to each playback frame can be determined according to the color data or motion data among others as described in the layer description data. Each frame description data is used to describe a state of the lighting-effect motion process, and a corresponding picture displayed by the ambient lamp.

Step S5420: in accordance with light source position distribution information of the ambient lamp, transforming each sub-frame description data of the base layer into the first lighting-effect control data that is provided by each light source in a corresponding ambient lamp with control data.

In the ambient lamp apparatus, the controller will predetermine the light source position distribution information of the ambient lamp, wherein the position information of each light-emitting unit in the ambient lamp is described in the display frame. Based on this, when the background lighting-effect needs to be played, all the frame description data of the base layer can be transformed into the corresponding lighting-effect control data by referring to the light source position distribution information, which actually completes the formal transformation and format encapsulation from the sub-frame description data to the lighting-effect control data. The lighting-effect control data of all the sub-frame description data constitute the first lighting-effect control data that correspond to the background lighting-effect, and the first lighting-effect control data can be used for controlling the ambient lamp to play the corresponding background lighting-effect.

As can be seen from the above embodiments, by providing the ability to frame the layer description data of the base layer, the base layer can gain support to realize the description of the lighting-effect motion procedures, and the user can gain support to customize the motion effect of the background lighting-effect, thereby enhancing the ability to shape the background lighting-effect and facilitating the user customizing an overall lighting-effect with a stronger feeling of immersion.

On the basis of any embodiment of the method in the present disclosure, steps before sending a second lighting-effect control data corresponding to each carousel layer to the ambient lamp sequentially according to a carousel sequence comprise:

Step S5430: according to the layer description data of each of the carousel layers, determining a sub-frame description data of each playback frame that corresponds to lighting-effect motion procedure described thereby;

To provide the ambient lamp with the second lighting-effect control data that correspond to each carousel layer of the foreground lighting-effect, the layer description data of each current carousel layer that is about to be played can be called for basic processing. Specifically, according to the lighting-effect motion procedures described by the layer description data, the layer description data can be processed by framing. For example, the layer description data of the current carousel layer describes the completion of the scaling operation of one pattern within 1 second; based on this, the specific playback frame number of the lighting-effect motion procedures can be determined according to the frame rate preset for the ambient lamp; then, the sub-frame description data that correspond to each playback frame can be determined according to the color data and motion data among others as described in the layer description data. All the sub-frame description data are used for describing pictures that are displayed by the ambient lamp and correspond to each state in the lighting-effect motion procedures.

Step S5440: in accordance with light source position distribution information of the ambient lamp, transforming each sub-frame description data of the carousel layers into the second lighting-effect control data that is provided by each light source in a corresponding ambient lamp with control data.

For the same reason, in the ambient lamp apparatus, the controller will pre-determine the light source position distribution information of the ambient lamp, wherein the position information of each light-emitting unit in the ambient lamp is described in the display frame. Based on this, when the foreground lighting-effect that corresponds to the current carousel layer needs to be played, all the frame description data of the current carousel layer can be transformed into the corresponding lighting-effect control data by referring to the light source position distribution information, which actually completes the formal transformation and format encapsulation from the sub-frame description data to the lighting-effect control data. The lighting-effect control data of all the sub-frame description data constitute the second lighting-effect control data that correspond to the current carousel layer in the foreground lighting-effect, and the second lighting-effect control data can be used for controlling the ambient lamp to play the foreground lighting-effect that corresponds to the current carousel layer.

It is not difficult to understand that each carousel layer can be processed according to the same course as mentioned above, so as to realize the generation of the second lighting-effect control data that correspond to each carousel layer in the entire foreground lighting-effect.

As can be seen from the above embodiments, by providing the ability to frame the layer description data of the carousel layer, the carousel layer can gain support to realize the description of the lighting-effect motion procedures, and the user can gain support to customize the motion effect of the foreground lighting-effect, thereby enhancing the ability to shape the foreground lighting-effect and facilitating the user customizing an overall lighting-effect with a stronger feeling of immersion.

Figure 6:
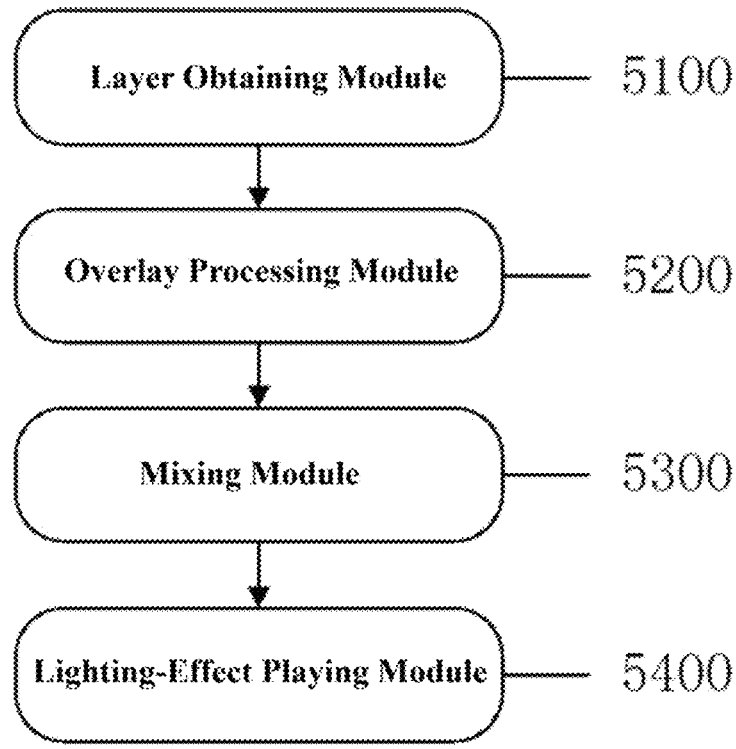
FIG. 6 is a structure diagram of a lighting-effect layer-level coordinated playback device in an embodiment of the present disclosure.

With reference to FIG. 6, in another embodiment of the present disclosure, there is also provided a lighting-effect layer-level coordinated playback device, which comprises a layer obtaining module 5100, an overlay processing module 5200, a mixing module 5300, and a lighting-effect playing module 5400, wherein: the layer obtaining module 5100 is arranged to obtain multiple lighting-effect layers, each of which is provided with a layer level and a layer type, and the layer type is set as one of an overlay type and a carousel type; the overlay processing module 5200 is arrange to set a stacking relationship of the respective first lighting-effect layers according to the layer level of each first lighting-effect layer that belongs to the overlay type, and merge the respective first lighting-effect layer into a base layers of the overall lighting-effect; the mixing module 5300 is arranged to set a sequential relationship of the respective second lighting-effect layers according to the layer level of each second lighting-effect layer that belongs to the carousel type, and use each second lighting-effect layer as carousel layers with corresponding sequences in the overall lighting-effect, respectively; the lighting-effect playing module 5400 is arranged to control an ambient lamp to play the base layer continuously as a background lighting-effect and play each of the carousel layers alternately as a foreground lighting-effect, and render the overall lighting-effect through the background lighting-effect and the foreground lighting-effect together.

On the basis of any embodiment of the device in the present disclosure, the layer obtaining module 5100 comprises: a lighting-effect parsing unit, which is arranged to receive a lighting-effect application package from a terminal apparatus, and parse the lighting-effect application package to obtain a layer description data that corresponds to each lighting-effect layer therein; a lighting-effect validating unit, which is arranged to validate the layer description data according to preset rules, and if validation is successful, identify the layer description data as corresponding lighting-effect layers and associate them with the layer level thereof and the layer type thereof; a background presetting unit, which is arranged to determine whether there is an initialization layer among the lighting-effect layers, and if yes, construct the initialization layer as the base layer that can be updated subsequently in the overall lighting-effect.

On the basis of any embodiment of the device in the present disclosure, after the operation of the layer obtaining module 5100, the lighting-effect layer-level coordinated playback device in the present disclosure comprises: a background adapting module, which is configured to determine whether there is a first lighting-effect layer that belongs to the overlay type among the multiple lighting-effect layers, and if not, generate a base layer according to preset rules, or obtain a pre-stored base layer from a storage apparatus.

On the basis of any embodiment of the device in the present disclosure, the overlay processing module comprises: a sorting processing unit, which is arranged to sort each first lighting-effect layer that belongs to the overlay type among the multiple lighting-effect layers in ascending order of the layer level thereof to obtain a layer list; a merging processing unit, which is arranged to mix multiple first lighting-effect layers with the same layer level in the layer list to obtain a single first lighting-effect layer, and overlay first lighting-effect layers that are sorted earlier with first lighting-effect layers that are sorted later to generate the latest base layer.

On the basis of any embodiment of the device in the present disclosure, the lighting-effect playing module 5400 comprises: a background playing unit, which is arranged to first lighting-effect control data that correspond to the base layer to the ambient lamp, and playing a corresponding background lighting-effect via the ambient lamp; a foreground playing unit, which is arranged to send second lighting-effect control data that correspond to each carousel layer to the ambient lamp sequentially according to a carousel sequence, and playing the foreground lighting-effect via the ambient lamp with the corresponding sequence; a loop iteration unit, which is arranged to iterate the previous step when the carousel sequence ends, and continuing the carousel of the foreground lighting-effect.

On the basis of any embodiment of the device in the present disclosure, before the operation of the background playing unit, the lighting-effect playing module 5400 further comprises: a background framing unit, which is arranged to, in accordance with the layer description data of the base layer, determine a sub-frame description data of each playback frame that corresponds to lighting-effect motion procedure described thereby; a background transforming unit, which is arranged to, in accordance with light source position distribution information of the ambient lamp, transform the sub-frame description data of the base layer into the first lighting-effect control data that is provided by each light source in a corresponding ambient lamp with control data.

On the basis of any embodiment of the device in the present disclosure, before the operation of the background playing unit, the lighting-effect playing module 5400 further comprises: a foreground framing unit, which is arranged to, in accordance with the layer description data of each of the carousel layers, determine a sub-frame description data of each playback frame that corresponds to lighting-effect motion procedure described thereby; a foreground transforming unit, which is arranged to, in accordance with light source position distribution information of the ambient lamp, transform the sub-frame description data of the carousel layers into the second lighting-effect control data that is provided by each light source in a corresponding ambient lamp with control data.

Figure 7:
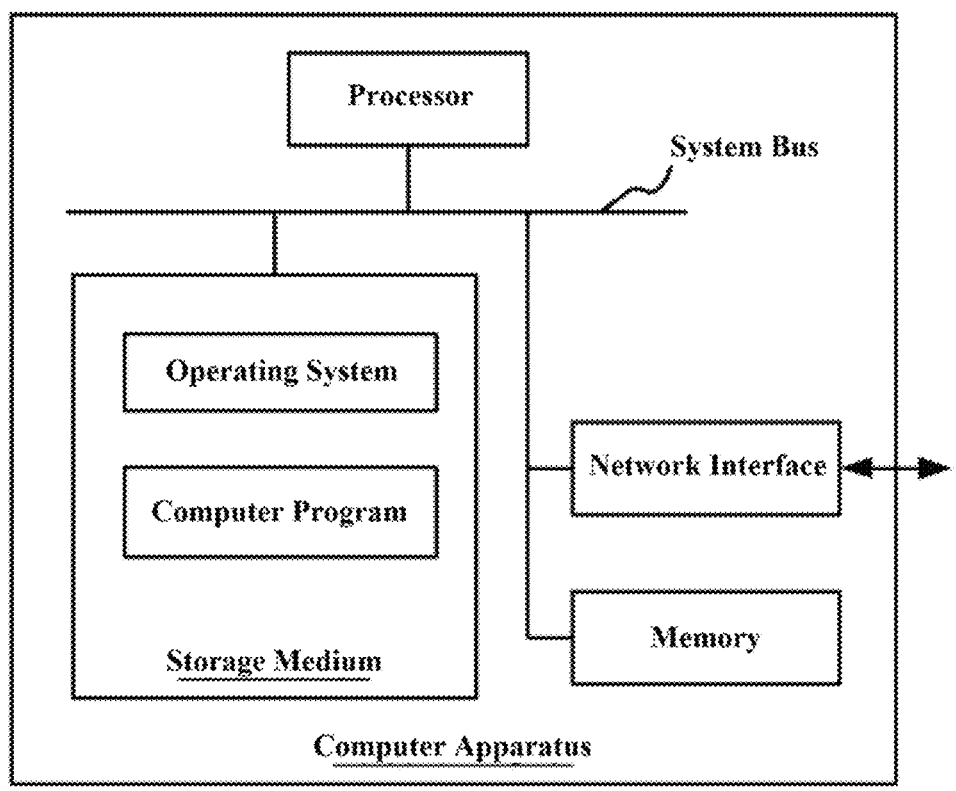
FIG. 7 is a structure diagram of a computer apparatus in an embodiment of the present disclosure.

On the basis of any embodiment of the present disclosure, with reference to FIG. 7, in another embodiment of the present disclosure, there is further provided a computer apparatus, which can be used as a controller in an ambient lamp apparatus. FIG. 7 is an internal structure diagram of the computer apparatus. The computer apparatus comprises a processor, a computer-readable storage medium, a memory, and a network interface that are connected through a system bus. Wherein, an operating system, a database, and a computer program that encapsulates computer-readable instructions are stored in the computer-readable storage medium of the computer apparatus. Control information sequences can be stored in the database. When executed by the processor, the computer-readable instructions can make the processor implement a lighting-effect layer coordinated playback method. The processor of the computer apparatus is used for providing computing and controlling capabilities to support the operation of the entire computer apparatus. Computer-readable instructions can be stored in the memory of the computer apparatus, and when executed by the processor, can make the processor execute the lighting-effect layer coordinated playback method in the present disclosure. The network interface of the computer apparatus is used for connection and communication with a terminal. Persons skilled in the art can understand that the structure shown in FIG. 7 is only a block diagram of a part of the structure related to the present disclosure, and does not constitute a limitation upon the computer apparatus, to which the solution of the present disclosure is applied. The specific computer apparatus can comprise more or fewer components than those shown in the figure, or be a combination of certain components, or have different component arrangements.

In this manner of implementation, the processor is used for executing the specific functions of each module and sub-modules thereof in FIG. 6, and program codes and various kinds of data required to execute the above modules or sub-modules are stored in the memory. The network interfaces are used for data transmission with user terminals or servers. The program codes and data required to execute all the modules/sub-modules in the lighting-effect lay-level coordinated playback device of the present disclosure are stored in the memory in this manner of implementation. The servers can call program codes and data of the servers to execute the functions of all the sub-modules.

The present disclosure further provides a storage medium, in which computer-readable instructions are stored. When executed by one or more processors, the computer-readable instructions make one or more processors execute the steps in the lighting-effect lay-level coordinated playback method described in any embodiment of the present disclosure.

The present disclosure further provides a computer program product, comprising a computer program/instruction. When executed by one or more processors, the computer program/instruction implements the steps in the lighting-effect lay-level coordinated playback method described in any embodiment of the present disclosure.

Persons skilled in the art can understand that all or some of the procedures in the above embodiment method of the present disclosure can be implemented by instructing relevant hardware through a computer program, which can be stored in a computer-readable storage medium. When executed, the program can comprise the procedures in the embodiments of the above methods. Wherein, the storage medium can be either a computer-readable storage medium, such as a magnetic disk, an optical disk, and Read-Only Memory (ROM), or Random Access Memory (RAM).

The above content only relates to some manners of implementation in the present disclosure. It should be pointed out that persons skilled in the art can make several improvements and embellishments without departing from the principles of the present disclosure, and these improvements and embellishments should also be deemed to fall within the scope of protection of the present disclosure.

In summary, the present disclosure can coordinate the playback course of lighting-effect layers that belong to different types and different levels in a standardized manner, enhance the compatibility and robustness of the ambient lamp apparatus, optimize the lighting-effect configuration of users and the user experience, and contribute to the promotion and popularization of the ambient lamp apparatus.

What is claimed is:

1. A lighting-effect layer coordinated playback method, comprising:
   obtaining multiple lighting-effect layers, each of which is provided with a layer level and a layer type, wherein the layer type is set as one of an overlay type and a carousel type;
   setting a stacking relationship of the respective first lighting-effect layers according to the layer level of each first lighting-effect layer that belongs to the overlay type, and merging the respective first lighting-effect layers into a base layer in an overall lighting-effect;
   setting a sequential relationship of the respective second lighting-effect layers according to the layer level of each second lighting-effect layer that belongs to the carousel type, and using each second lighting-effect layer as carousel layers with corresponding sequence in the overall lighting-effect, respectively;

controlling an ambient lamp to play the base layer continuously as a background lighting-effect and play each of the carousel layers alternately as a foreground lighting-effect, and rendering the overall lighting-effect through the background lighting-effect and the foreground lighting-effect together, which further comprises:

sending a first lighting-effect control data that corresponds to the base layer to the ambient lamp, and playing a corresponding background lighting-effect via the ambient lamp;

sending a second lighting-effect control data that corresponds to each carousel layer to the ambient lamp sequentially according to a carousel sequence, and playing the foreground lighting-effect via the ambient lamp with the corresponding sequence; and iterating the previous step when the carousel sequence ends, and continuing the carousel sequence of the foreground lighting-effect.

2. The lighting-effect layer coordinated playback method according to claim 1, wherein the obtaining multiple lighting-effect layers further comprises:

receiving a lighting-effect application package from a terminal apparatus and parsing the lighting-effect application package to obtain a layer description data that corresponds to each lighting-effect layer;

validating the respective layer description data according to a preset rule, and if validation is successful, identifying the respective layer description data as corresponding lighting-effect layers and associating them with the layer level thereof and the layer type thereof;

determining whether there is an initialization layer among the lighting-effect layers, and if yes, constructing the initialization layer as the base layer that can be updated subsequently in the overall lighting-effect.

3. The lighting-effect layer coordinated playback method according to claim 2, wherein before sending the second lighting-effect control data that corresponds to each carousel layer to the ambient lamp sequentially according to the carousel sequence, the method comprising:

in accordance with the layer description data of each of the carousel layers, determining a sub-frame description data of each playback frame that corresponds to a lighting-effect motion procedure described thereby;

in accordance with light source position distribution information of the ambient lamp, transforming each sub-frame description data of the carousel layers into the second lighting-effect control data that is provided by each light source in a corresponding ambient lamp with control data.

4. The lighting-effect layer coordinated playback method according to claim 1, wherein after obtaining multiple lighting-effect layers, the method comprising:

determining whether there are the first lighting-effect layers that belong to the overlay type among the multiple lighting-effect layers, and if not, generating the base layer according to a preset rule or retrieving a pre-stored base layer from a storage apparatus.

5. The lighting-effect layer coordinated playback method according to claim 1, wherein the setting a stacking relationship of the respective first lighting-effect layers according to the layer level of each first lighting-effect layer that belongs to the overlay type and merging the respective first lighting-effect layers into a base layer in the overall lighting-effect comprises:

sorting each first lighting-effect layer that belongs to the overlay type among the multiple lighting-effect layers in ascending order of the layer level thereof to obtain a layer list;

mixing multiple first lighting-effect layers with the same layer level in the layer list to obtain a single first lighting-effect layer, and overlaying first lighting-effect layers that are sorted earlier with first lighting-effect layers that are sorted later to generate the latest base layer.

6. The lighting-effect layer coordinated playback method according to claim 1, wherein before sending the first lighting-effect control data that corresponds to the base layer to the ambient lamp, the method comprising:

in accordance with a layer description data of the base layer, determining a sub-frame description data of each playback frame that corresponds to a lighting-effect motion procedure described thereby;

in accordance with light source position distribution information of the ambient lamp, transforming each sub-frame description data of the base layer into the first lighting-effect control data that is provided by each light source in a corresponding ambient lamp with control data.

7. An ambient lamp apparatus, comprising a central processing unit and a memory, wherein the central processing unit is used for calling and running a computer program that is stored in the memory to execute a lighting-effect layer coordinated playback method which comprises:

obtaining multiple lighting-effect layers, each of which is provided with a layer level and a layer type, wherein the layer type is set as one of an overlay type and a carousel type;

setting a stacking relationship of the respective first lighting-effect layers according to the layer level of each first lighting-effect layer that belongs to the overlay type, and merging the respective first lighting-effect layers into a base layer in an overall lighting-effect;

setting a sequential relationship of the respective second lighting-effect layers according to the layer level of each second lighting-effect layer that belongs to the carousel type, and using each second lighting-effect layer as carousel layers with corresponding sequence in the overall lighting-effect, respectively;

controlling an ambient lamp to play the base layer continuously as a background lighting-effect and play each of the carousel layers alternately as a foreground lighting-effect, and rendering the overall lighting-effect through the background lighting-effect and the foreground lighting-effect together, which further comprises:

sending a first lighting-effect control data that corresponds to the base layer to the ambient lamp, and playing a corresponding background lighting-effect via the ambient lamp;

sending a second lighting-effect control data that corresponds to each carousel layer to the ambient lamp sequentially according to a carousel sequence, and playing the foreground lighting-effect via the ambient lamp with the corresponding sequence; and iterating the previous step when the carousel sequence ends, and continuing the carousel sequence of the foreground lighting-effect.

8. A non-volatile readable storage medium, wherein a computer program is stored, in form of computer-readable instructions, in the non-volatile readable storage medium, and executes a lighting-effect layer coordinated playback method when called by a computer, the lighting-effect layer coordinated playback method comprising:
- obtaining multiple lighting-effect layers, each of which is provided with a layer level and a layer type, wherein the layer type is set as one of an overlay type and a carousel type;
- setting a stacking relationship of the respective first lighting-effect layers according to the layer level of each first lighting-effect layer that belongs to the overlay type, and merging the respective first lighting-effect layers into a base layer in an overall lighting-effect;
- setting a sequential relationship of the respective second lighting-effect layers according to the layer level of each second lighting-effect layer that belongs to the carousel type, and using each second lighting-effect layer as carousel layers with corresponding sequence in the overall lighting-effect, respectively;
- controlling an ambient lamp to play the base layer continuously as a background lighting-effect and play each of the carousel layers alternately as a foreground lighting-effect, and rendering the overall lighting-effect through the background lighting-effect and the foreground lighting-effect together, which further comprises:
- sending a first lighting-effect control data that corresponds to the base layer to the ambient lamp, and playing a corresponding background lighting-effect via the ambient lamp;
- sending a second lighting-effect control data that corresponds to each carousel layer to the ambient lamp sequentially according to a carousel sequence, and playing the foreground lighting-effect via the ambient lamp with the corresponding sequence; and
- iterating the previous step when the carousel sequence ends, and continuing the carousel sequence of the foreground lighting-effect.

\* \* \* \* \*